(12) United States Patent
Simard et al.

(10) Patent No.: US 7,707,248 B2
(45) Date of Patent: Apr. 27, 2010

(54) CREDIT-BASED PEER-TO-PEER STORAGE

(75) Inventors: Patrice Y. Simard, Bellevue, WA (US); Paul Alfred Viola, Seattle, WA (US); Jin Li, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 319 days.

(21) Appl. No.: 11/768,189

(22) Filed: Jun. 25, 2007

(65) Prior Publication Data

US 2008/0320140 A1 Dec. 25, 2008

(51) Int. Cl.
*G06F 15/16* (2006.01)

(52) U.S. Cl. ............... 709/204; 709/203; 709/223; 709/224; 709/226

(58) Field of Classification Search ........... 709/204, 709/223, 203, 224, 226
See application file for complete search history.

(56) References Cited

U.S. PATENT DOCUMENTS

| | | | | |
|---|---|---|---|---|
| 5,596,576 A * | 1/1997 | Milito | ...................... | 370/450 |
| 5,771,354 A * | 6/1998 | Crawford | ................... | 709/229 |
| 5,901,228 A * | 5/1999 | Crawford | ................... | 705/34 |
| 6,195,732 B1 * | 2/2001 | Adams et al. | ............... | 711/156 |
| 6,351,776 B1 * | 2/2002 | O'Brien et al. | ............ | 709/245 |
| 6,356,941 B1 | 3/2002 | Cohen | | |
| 6,411,943 B1 * | 6/2002 | Crawford | ................... | 705/400 |
| 6,574,717 B1 * | 6/2003 | Ganesh et al. | ............. | 711/147 |
| 6,898,634 B2 * | 5/2005 | Collins et al. | ............. | 709/226 |
| 6,952,737 B1 * | 10/2005 | Coates et al. | ............. | 709/229 |
| 7,028,085 B2 * | 4/2006 | Nakagawa et al. | ......... | 709/224 |
| 7,069,295 B2 | 6/2006 | Sutherland et al. | | |
| 7,130,621 B2 | 10/2006 | Blawat et al. | | |
| 7,136,927 B2 * | 11/2006 | Traversat et al. | ........... | 709/230 |
| 7,152,077 B2 | 12/2006 | Veitch et al. | | |
| 7,197,608 B2 * | 3/2007 | Mikuma et al. | ............ | 711/151 |
| 2002/0116264 A1 * | 8/2002 | Feidelson et al. | ............ | 705/14 |
| 2002/0194326 A1 * | 12/2002 | Gold et al. | .................. | 709/224 |
| 2003/0055972 A1 * | 3/2003 | Fuller et al. | ................. | 709/226 |
| 2004/0010654 A1 * | 1/2004 | Yasuda et al. | .................. | 711/1 |
| 2004/0193824 A1 * | 9/2004 | Johnson | ..................... | 711/170 |
| 2004/0209622 A1 * | 10/2004 | Kotzin | ..................... | 455/452.1 |
| 2004/0215749 A1 * | 10/2004 | Tsao | ......................... | 709/220 |
| 2004/0260973 A1 | 12/2004 | Michelman | | |

(Continued)

OTHER PUBLICATIONS

Cox, et al., "Samsara: Honor among Thieves in Peer-to-Peer Storage", Oct. 19-22, 2003, ACM, 2003, pp. 13.

(Continued)

*Primary Examiner*—Saleh Najjar
*Assistant Examiner*—Waseem Ashraf (57) ABSTRACT

Distributed computing devices comprising a system for sharing computing resources can provide shared computing resources to users having sufficient resource credits. A user can earn resource credits by reliably offering a computing resource for sharing for a predetermined amount of time. The conversion rate between the amount of credits awarded, and the computing resources provided by a user can be varied to maintain balance within the system, and to foster beneficial user behavior. Once earned, the credits can be used to fund the user's account, joint accounts which include the user and others, or others' accounts that do not provide any access to the user. Computing resources can be exchanged on a peer-to-peer basis, though a centralized mechanism can link relevant peers together. To verify integrity, and protect against maliciousness, offered resources can be periodically tested.

18 Claims, 8 Drawing Sheets

U.S. PATENT DOCUMENTS

| | | | |
|---|---|---|---|
| 2005/0076113 A1* | 4/2005 | Klotz et al. | 709/224 |
| 2005/0097440 A1* | 5/2005 | Lusk et al. | 715/500.1 |
| 2005/0138181 A1 | 6/2005 | Gallet et al. | |
| 2005/0228948 A1* | 10/2005 | Mikuma et al. | 711/114 |
| 2005/0273511 A1* | 12/2005 | Ferreira de Andrade et al. | 709/227 |
| 2005/0278552 A1 | 12/2005 | Delisle et al. | |
| 2006/0294571 A1 | 12/2006 | Moore et al. | |
| 2007/0091809 A1* | 4/2007 | Smith | 370/235 |
| 2007/0094323 A1* | 4/2007 | Smith | 709/202 |
| 2007/0208834 A1* | 9/2007 | Nanamura et al. | 709/220 |
| 2008/0016185 A1* | 1/2008 | Herberger et al. | 709/219 |
| 2008/0119162 A1* | 5/2008 | Sivalingam et al. | 455/408 |
| 2008/0147821 A1* | 6/2008 | Dietrich et al. | 709/216 |
| 2008/0172489 A1* | 7/2008 | Zhu et al. | 709/226 |
| 2008/0250143 A1* | 10/2008 | Garg et al. | 709/226 |

OTHER PUBLICATIONS

Anagnostakis, et al., "Exchange-based Incentive Mechanisms for Peer-to-Peer File Sharing", Mar. 2004, pp. 10.

Cooper, et al., "Peer-to-Peer Resource Trading in a Reliable Distributed System", Mar. 2002, pp. 1-6.

* cited by examiner

CREDIT-BASED PEER-TO-PEER STORAGE

BACKGROUND

Computer-readable data is traditionally stored on computer-readable media that is co-located with the computing device that most often accesses such data. For example, most personal computing devices comprise built-in hard drives and removable media drives such as optical drives which store the computer-readable data most often used by those computing devices. However, co-located computer-readable media is subject to the same physical environment as the computing device itself. Thus, physical damage to the computing device will also likely result in physical damager to the co-located computer-readable media and thereby possibly causing the loss of the computer-readable data.

To hedge against such physical damage, computer-readable data can be copied from co-located computer-readable media to remotely located computer-readable media, traditionally via a computer network. Such a "backup" process can provide protection of data in the event of localized physical damage. As computer networking hardware and infrastructure has improved, remote backups have become more popular, not only for critical corporate or business data, but also for personal data, such as digital photos and videos, and personal documents such as school assignments.

Because individuals often lack the necessary infrastructure to set up and maintain remote computer-readable storage media, a business model has emerged that provides access to remote computer-readable storage media to multiple individual consumers via common networking protocols and mechanisms, such as the ubiquitous World Wide Web (WWW). Traditionally, those offering such remote backup services to individual consumers maintain one or more data centers comprising the computer-readable storage media that is being used to remotely store the consumers' computer-readable data.

Paralleling improvements in networking hardware and infrastructure are improvements in the storage capacity of computer-readable media. Consequently, many individuals use computing devices equipped with co-located computer-readable media whose storage capacities far exceed the computer-readable data that the individual has to store thereon. Furthermore, such extra data storage space cannot be used by the individual to backup their own data, as the backup would then be subject to the same data-loosing impacts as the original data.

SUMMARY

The extra data storage capabilities of computer-readable media co-located with various computing devices can be used to provide remote storage capabilities, removing the need for dedicated data centers and the associated computing hardware and computer-readable media. Fault tolerant encoding algorithms can be used to divide data into multiple segments such that the data can still be recovered despite the unavailability, or loss, of one or more segments. The segments can be distributed among computer-readable media co-located with various computing devices, thereby providing remote storage capabilities. Complementing the security afforded by distributing the segments, the data can also be encrypted prior to segmentation, ensuring that only authorized individuals may be provided access to the data.

In one embodiment, to provide for a self-sustaining system, a Gigabyte Access Day (GAD) can be awarded to an account that has provided continuous access to a defined amount of storage capacity for a defined period of time. In so doing the account holder can enable segments of others' data to be stored on a computer-readable medium co-located with the account holder's computing device. Once earned, GADs can be used by the account holder to store their own data remotely. Specifically, a single GAD can enable the account holder to store up to one gigabyte of data remotely for up to one 24-hour period.

The conversion rate associating the amount of earned GADs to the amount of storage provided and the length of time for which it was provided can also account for variables within the overall system, including the reliability of the provided storage. For example, the conversion rate used for a computing device that provides storage with 75% reliability can be such that the provision, by such a computing device of a gigabyte of storage capacity for one day can only earn 0.75 GADs. The conversion rate can further be varied to achieve goals or guide user behavior. For example, if users begin accumulating more GADs than are being used, the system will experience a GAD surplus that it may not be able to support with underlying available storage. Consequently, the conversion rate can be decreased such that providing continuous access to one gigabyte of storage capacity for one 24-hour period earns less than one GAD. The conversion rate can also take into account various risk factors, such as individual user's network reliability and uptime. In another embodiment, multiple conversion rates can be used, where a higher conversion rate can be applied for storage that is both made available and actually used by others and a lower conversion rate can be applied for storage that is made available but not currently used.

Once earned, GADs can be used, not only for the benefit of the account holder, but also for the benefit of others. For example, the account holder can set up an account for family members who are not sufficiently online to earn their own GADs, and can transfer GADs into their account to enable such family members to store information remotely. In an alternative embodiment, the account holder can set up a joint account and transfer GADs into it, enabling the account holder to provide remote storage to the account holder's co-workers, subcontractors, or others with whom the account holder may wish to share information. In a still further alternative embodiment, GADs can be transferred to accounts that are wholly independent of the user who earned the GADs. For example, GADs could be sold through online auctions, or otherwise purchased, and transferred to the account of the purchaser.

To minimize the computational requirements of managing a distributed storage system, and to provide users' further peace of mind, a centralized server can avoid receiving any of the data that users' are storing remotely. Instead, the centralized server can merely identify relevant peers to one another, enabling peer-to-peer communication. To accurately credit GADs to accounts, the centralized server can periodically request one peer to test another to verify the storage capacity being offered and protect against malicious behavior. Such tests can comprise communicational pings, checksum comparisons, and, if appropriate, data verification. If no user data is stored at a peer, random data can be generated for testing purposes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the provision of distributed remote storage according to a pay-forward scheme, whereby credits earned for enabling others to store computer-readable data on computer-readable media co-located with a user's computing device enables that user to remotely store their own computer-readable data. A conversion rate between the amount of storage offered by a user and the amount of storage credit provided in return can be adjusted to maintain balance within the overall remote storage system, rendering the system self-sustaining. The earned storage credit can be universally used, including enabling others to remotely store computer-readable data, either in association with the user who earned the storage credit, or independently.

The techniques described herein focus on, but are not limited to, the provision of storage credits in units of gigabyte-access-days, enabling access to a gigabyte of computer-readable storage capacity for one 24-hour period. Indeed, the quantum unit of storage credit can equally be a megabyte-access-day, a gigabyte-access-hour, or any other unit of storage per unit of time. Similarly, while the techniques below focus on storage credits, other computing resources that can be shared and distributed can equally utilize the described mechanisms. For example, the mechanisms described below can be identically applied to processing credits, which can be assigned based on the processing capability provided by a user, and which can subsequently enable that user, or whomever they transfer such credit to, to utilize remote processors for a period of time for the performance distributed computations.

Figure 1:
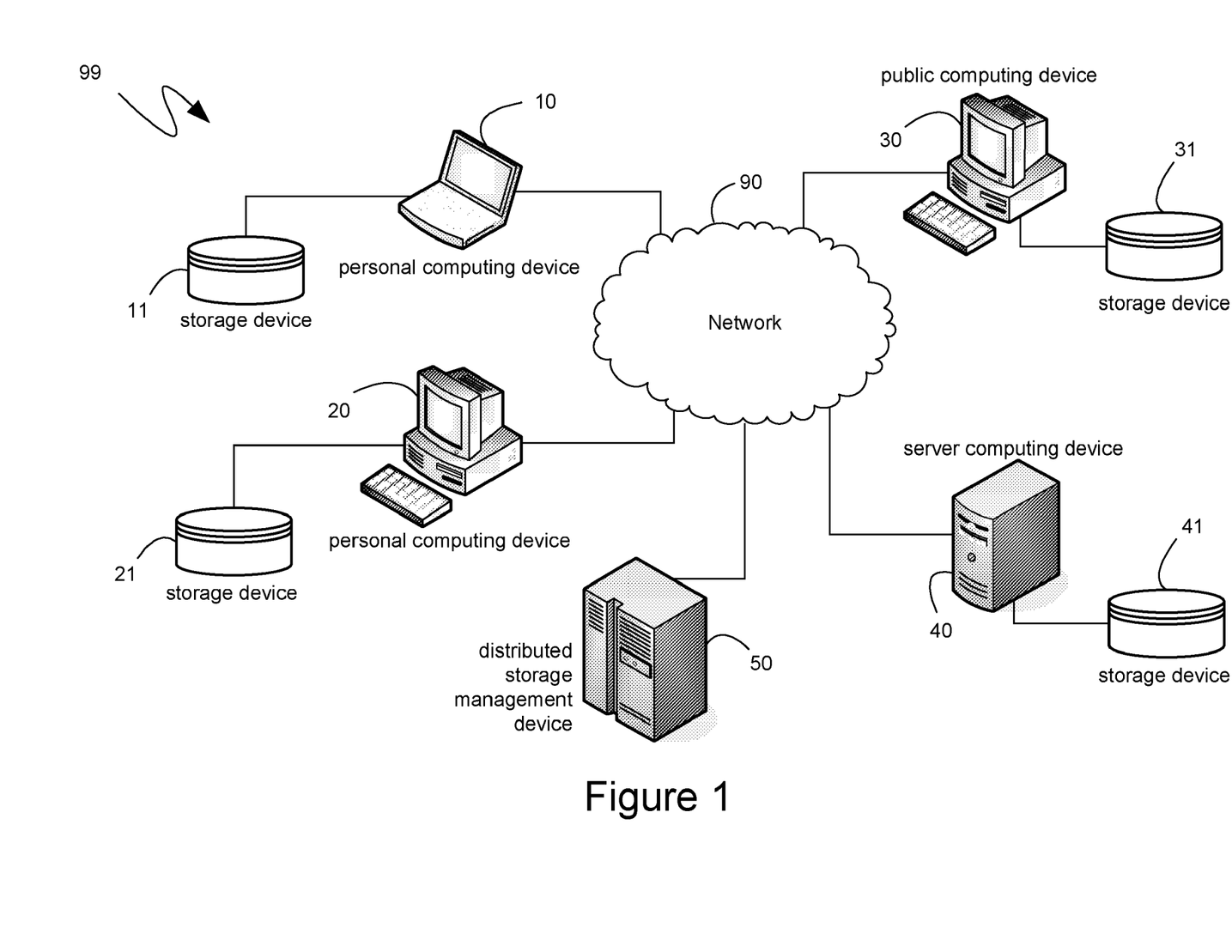
FIG. 1 is a block diagram of an exemplary system that provides context for the described functionality.

Turning to FIG. 1, an exemplary network system 99 is illustrated comprising the network 90 itself, personal computing devices 10 and 20, a public computing device 30, a server computing device 40, and a distributed storage management device 50, all connected to the network 90. Each of the computing devices 10, 20, 30 and 40 can comprise storage devices 11, 21, 31 and 41, respectively, that can be co-located with the computing devices. Examples of such co-located storage devices include both computer-readable storage media that is internal to a computing device case and computer-readable storage media that can be connected to the computing device via local cabling.

In one embodiment, some or all of the storage capacity of the storage devices 11, 21, 31 and 41 can be offered by the respective computing device 10, 20, 30 and 40 to the other computing devices connected to the network 90. Such a decision can be made by administrators of the computing devices 10, 20, 30 and 40, or, in multi-user environments, each user of the computing devices 10, 20, 30 and 40 can offer some or all of the storage capacity that is allocated to that user from the storage devices 11, 21, 31 and 41. Similarly, some or all of the processing capability of the computing devices 10, 20, 30 and 40 can be offered for use by other computing devices connected to the network 90.

A centralized server, such as the distributed storage management device 50, can receive offers to share storage space, processing capability, or other sharable computing resources from the computing devices 10, 20, 30 and 40 or, more precisely, from one or more users or administrators of those computing devices. The distributed storage management device 50 can maintain account information for each user and can credit each user's account an appropriate amount of credits given the amount of resources offered by the user, the length of time such resources were offered, the reliability of such resources, and like information. The amount of credits given based on such resources can be further influenced by a conversion factor that can be adjusted by the distributed storage management device 50 based, at least in part, on the balance within the system 99 between outstanding credits and offered, but unused, resources.

The distributed storage management device 50 can also match a peer computing device that seeks to use a distributed resource with a peer computing device that is offering such a resource for use. The distributed storage management device 50 can identify such peers to one another, thereby enabling peer-to-peer communication to implement the resource sharing. In one embodiment, the distributed storage management device 50 need not handle any shared data; instead, all such sharing can occur strictly between peers.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Figure 2:
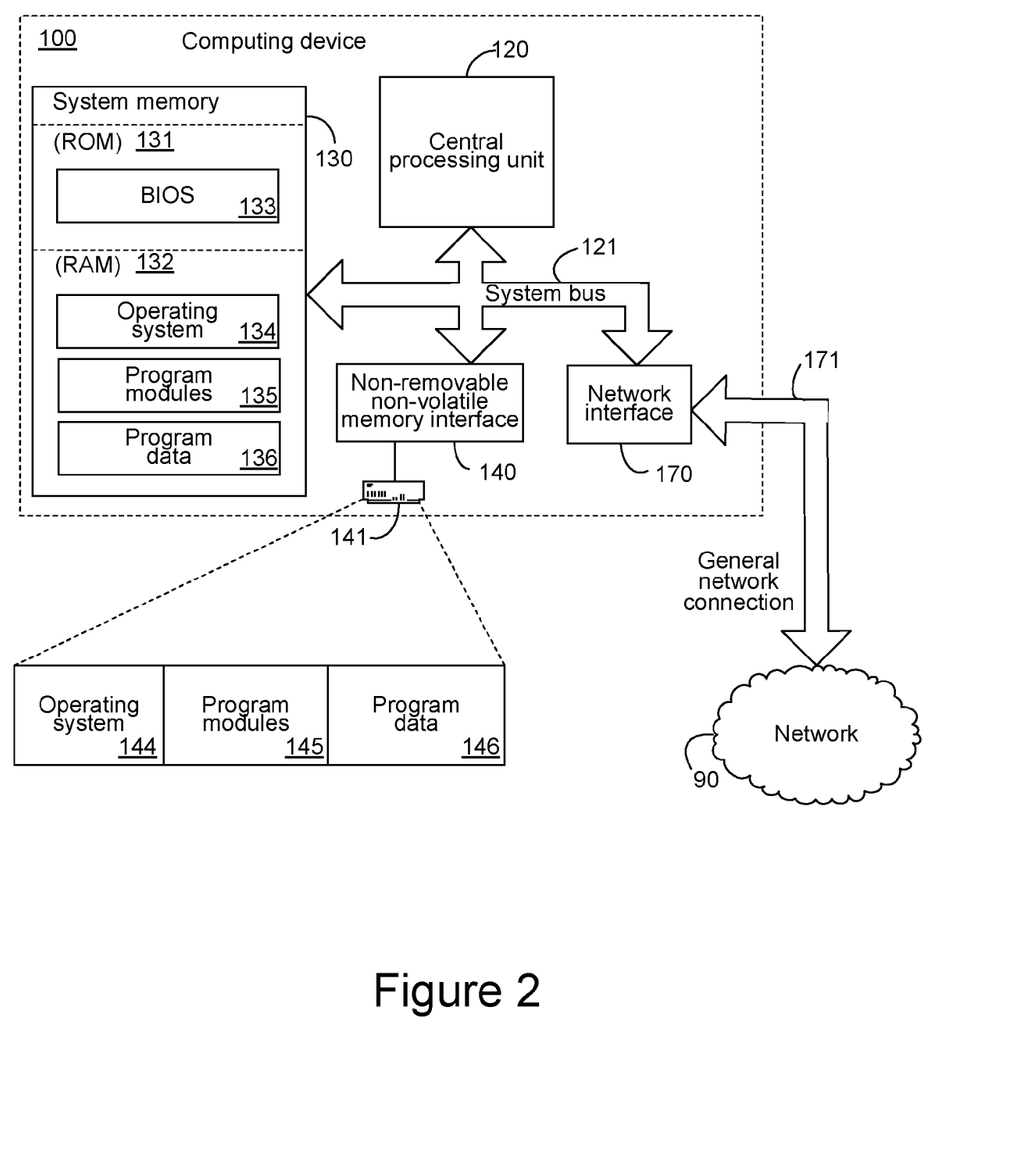
FIG. 2 is a block diagram of an exemplary computing device.

With reference to FIG. 2, an exemplary computing device 100 is illustrated. The computing device 100 can represent any of the computing devices 10, 20, 30, 40 or 50 of FIG. 1. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates an operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

Of relevance to the descriptions below, the computing device 100 may operate in a networked environment using logical connections to one or more remote computers. For simplicity of illustration, the computing device 100 is shown in FIG. 2 to be connected to a network 90 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 3A:
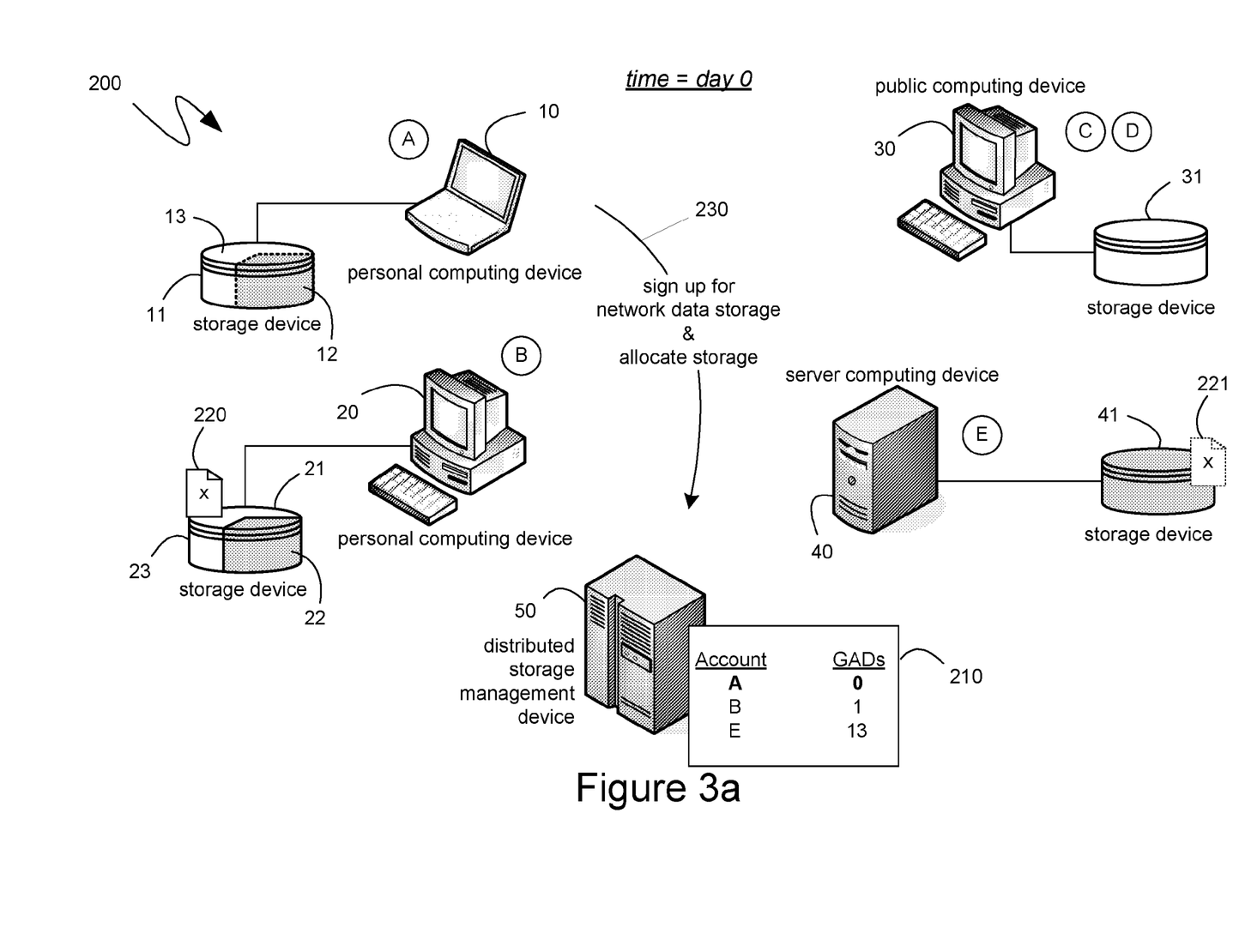
FIGS. 3a and 3b are block diagrams of an exemplary system supporting remote storage.

The general network connection 171 to the network 90 can enable the computing device 100 to utilize remote resources, such as remote storage media. Turning to FIG. 3a, a system 200 is illustrated showing initiating steps for enabling a computing device to remotely store computer-readable data. The system 200 comprises the same elements as system 99 of FIG. 1, except that, while connections amongst the computing devices 10, 20, 30, 40 and 50, via the network 90, remain, they are not specifically illustrated for the sake of visual clarity. In addition, to provide context for the descriptions below, each of the computing devices 10, 20, 30 and 40 have been associated with one or more users. Specifically, as shown in FIG. 3a, personal computing devices 10 and 20 can be used by users "A" and "B", respectively. The public computing device 30 can be used by multiple individuals, represented in the below descriptions are users "C" and "D", and the server computing device 40 can be administered by a user "E".

As indicated in FIG. 3a, the system 200 reflects a random initial time from which mechanisms for implementing a pre-earned credit-based resource sharing service can be analyzed. The illustrated indication in FIG. 3a is not meant to reflect an initial time for the overall system 200, but rather only for the descriptions below. For example, at the time illustrated in FIG. 3a, storage space on storage devices 21 and 41 can have already been offered, by users B and E, respectively to the distributed storage management device 50. The storage capacity offered is illustrated in FIG. 3 in the form of a shaded section of the hosting storage device. Thus, for example, storage device 21 comprises a shared section 22 and a private section 23 reserved for use with the personal computing device 20, to which the storage device 21 is connected. Similarly, storage device 41 is completely shaded, illustrating that a storage device can be entirely dedicated to hosting remotely stored data. As will be described further below, the shared storage capability 22 and 41 can have, by the time illustrated in FIG. 3a, earned both user B and user E credits.

The distributed storage management device 50 can maintain a database 210 whereby credits earned for sharing computing resources can be tracked with the account of the individual responsible for sharing those resources. Thus, as shown in FIG. 3a, the database 210 can comprise an account for user B and an account for user E, each having already earned at least one credit. The specific credits illustrated are Gigabyte-Access-Days (GADs), though the below descriptions are, in no way, limited only to such credits. A GAD, as suggested by its name, can define a particular amount of resource sharing; in this case, the sharing of a gigabyte of computing storage capability for one day. In the exemplary database illustrated in FIG. 3a, the GADs earned by user B can be less than those earned by user E because of the relative storage capability being offered for sharing by users B and E, respectively.

As will be described in further detail below, for a user to use whatever computing resources are being made available within the system 200, such a user can first be required to earn credits by themselves offering up, for sharing, resources from their own computing device. To offer shared resources, and thereby earn credits, a user, such as user A, can use a computing device, such as A's personal computing device 10, to offer shared resources to a management device, such as the distributed storage management device 50. Thus, as shown, a message 230 from the computing device 10 can request that the distributed storage management device 50 create a new entry in the database 210 reflecting the addition of the account of user A. Included with the message 230 can also be information regarding the amount of resources being shared, such as the amount of storage capacity being shared 12. And, in addition to sending message 230, the computing device 10 can also set aside the shared storage capacity 12 of the storage device 13, thereby separating it from the storage capacity 11 being retained for local access by the computing device.

Figure 3B:
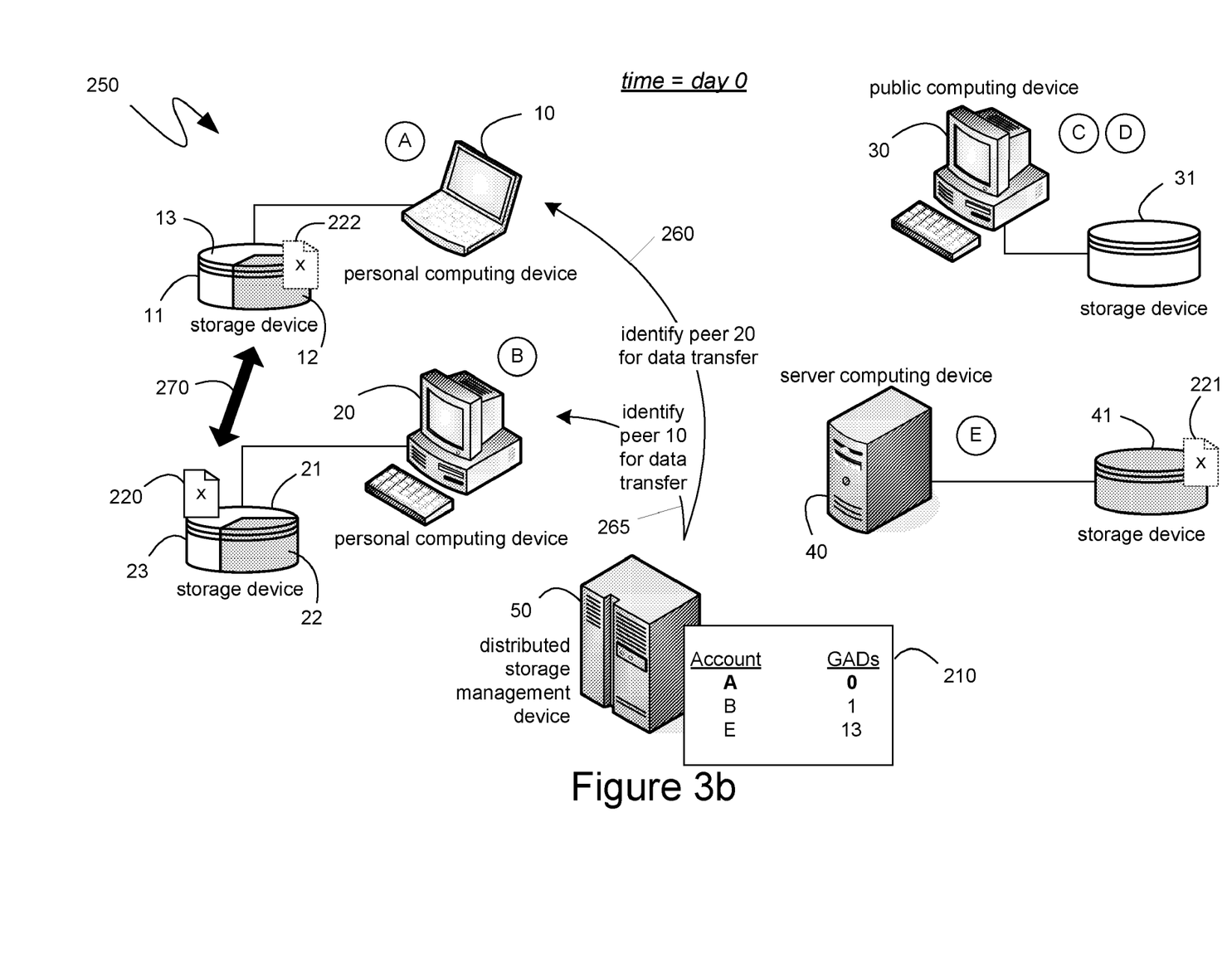

Upon receipt of a notification of shared resources, such as message 230, the distributed storage management device 50 can create an appropriate account for the requesting user within the database 210. Thus, as illustrated in bold in FIG. 3a, a new account for user A can be created by the distributed storage management device 50. The distributed storage management device 50 can also identify one or more computing devices, such as computing device 20, that may have requested a shared resource, and can identify both the sharing and requesting computing devices to one another. For example, as shown in FIG. 3b, the distributed storage management device 50 can notify the computing device 10, via message 260, of the computing device 20 that may have requested the use of remote storage capacity. Similarly, via message 265, the distributed storage management device 50 can notify computing device 20 of the computing device 10 that has volunteered to host shared storage capacity 12.

In response to such messages from the distributed storage management device 50, client software on the computing devices 10 and 20 can initiate peer-to-peer communication 270 and can transfer data from the requesting computing device 20 to the sharing computing device 10. For example, in the exemplary system 250, the computing device 20 may comprise a locally stored file 220 that it seeks to backup remotely. Consequently, once it receives a message, such as message 265, client code on the computing device 20 can, transparently to the user B, transfer some or all of the data of the file 220 to the shared portion 12 offered by the computing device 10. File 222, and file 221 on storage device 41, are meant to represent some or all of file 220 which can be remotely stored in a secure and fault-tolerant manner.

In one embodiment, client software, such as on the computing device 20 that is remotely backing up the file 220, can encrypt the file 220 and can then divide the encrypted file into segments such that, even if some segments were to be lost, the encrypted file could be reconstructed and decrypted into file 220. Because other computing devices that offer shared storage, such as computing devices 10 and 40, would only have access to those components 222 and 221, respectively, of the file 220 that were stored on the storage devices 11 and 41, respectively, those other computing devices would not be able to recover the file 220, or gain unauthorized access to its contents. Furthermore, even if another computing device was able to reassemble file 220 from its remotely stored components, such a computing device would still not be able to access the contents of file 220 because it would lack the necessary decryptors.

Fault-tolerant encoding and storage schemes are well known to those skilled in the art, and the mechanisms herein described are not limited to, or require the use of, any particular scheme. In one embodiment, however, the well-known Reed-Solomon encoding scheme can be used to divide a file 220, after it has been encrypted, into components which can be stored remotely in multiple locations. The Reed-Solomon encoding scheme enables the reconstruction of the encrypted file from the components even if up to a predetermined maximum number of components are not available at the time the file 220 is requested by the computing device 20 from remote storage.

In practice, it is expected that the shared storage capacity, such as shared storage 12, 22 and 41, will comprise components of a myriad of files. To maximize the fault-tolerance of the system 250, the distributed storage management device 50 can apply various mechanisms to the initiation of peer-to-peer communication, such as peer-to-peer communication 270. For example, in one embodiment, peers can be identified to one another, such as via messages 260 and 265, based on a host of factors, including the physical location of the peers, the physical locations of other components of a remotely stored file, the operating system used by the peers, the bandwidth capabilities of the peers' connections to the network 90, and the reliability of the peers. By setting up peer-to-peer communications that can distribute components of a remotely stored file in a geographically diverse manner, the distributed storage management device 50 can provide further fault tolerance against regional disasters, such as a flood or earthquake. Similarly, by setting up peer-to-peer communications that can distribute components of a remotely stored file to computing devices utilizing diverse operating systems, the distributed storage management device 50 can provide further fault tolerance against malware, which generally is relevant only to the targeted operating system.

The distributed storage management device 50 can provide both short term and long term fault tolerance. For example, it can provide short term fault tolerance by dividing a file into components where the overall file can be reconstructed even if one or more of the components are on a computing device that is experiencing a temporary failure, such as due to a power outage, network outage, or merely the need for a software update. Similarly, the distributed storage management device 50 can provide for long term fault tolerance by dividing a file such that the file can be reconstructed even if one or more of the components are on a computing device that has experienced a permanent, or what appears to be a permanent loss of data, such as due to a hardware failure, regional disaster, or the deactivation of the computing device.

In one embodiment, to monitor the reliability of a peer, the distributed storage management device 50 can periodically request one or more other peers to test the peer being monitored. One test, which can be performed either by other peer computing devices, or even by the distributed storage management device 50 itself, is a simple network ping or similar communication that serves to merely verify that the monitored peer is communicating with the network 90. A more accurate test of a peer's ability to provide the file component stored with the peer when requested can be the requesting of a hash, or other computation, of the file component stored with the peer. For example, in one embodiment, when a peer, such as computing device 20, divides a file 220 into components for remote storage, it can similarly calculate a hash value for each component that uniquely represents the data of the component. Subsequently, upon initiation by the distributed storage management device 50, the computing device 20 can test a peer currently storing one of the components of the file 220, such as the computing device 10, by requesting that the computing device 10 calculate a hash of the component 222 and provide such a hash to the computing device 20. If the hash value provided by the computing device 10 matches that maintained by the computing device 20, the computing device 20 can report to the distributed storage management device 50 that the computing device 10 is online and operating properly.

By requesting one or more peer computing devices to test other peer computing devices, the distributed storage management device 50 can avoid potential malicious behavior whereby a malicious computing device responds properly when tested by the distributed storage management device 50, but responds improperly when a peer attempts to retrieve the data stored on the malicious device. Another form of malicious behavior can be the storage, by a peer, of the hash of a component of a remotely stored file, but not the component itself. In such a case, the malicious peer would be able to properly provide a hash of the component when requested, in the manner described above, but would not be able to provide the component itself when the originating peer attempted to access the remotely stored file. To protect against this type of maliciousness, a further test can be requested by the distributed storage management device 50 whereby the originating peer requests all of the data comprising the file component stored on the peer being tested. For example, the distributed storage management device 50 could request that the computing device 20 test the computing device 10 by requesting the entire file component 222, as opposed to only its hash. However, because such a request can require more resources than merely obtaining and comparing a hash value, in one embodiment, the various tests described are performed with a periodicity inversely proportional to their computational and communicational cost. Thus, merely pinging a computing device could be performed frequently, while requesting all of the data of a file component could be performed infrequently.

Once the computing device 10 has offered some amount of computing resources, such as the shared storage 12, for at least a minimum amount of time, the account corresponding to such an offering can be credited with an earned credit that can be subsequently redeemed to enable the holder of the account to themselves consume shared computing resources. For example, FIG. 4a comprises a system 300 that is analogous to systems 200 and 250, described previously, except that system 300 illustrates a time one day later than the time of systems 200 and 250. In the illustrated example, the shared storage 12 offered by user A via computing device 10 can comprise two gigabytes. Since user A provided two gigabytes of shared storage for one day, their account can be credited with two Gigabyte Access Days (GADs), enabling user A to themselves store up to two gigabytes of data for up to one 24-hour period, or up to one gigabyte of data for up to two days, or any like combination thereof.

In one embodiment, the amount of shared resource credit granted to an account as payment for resources shared by that account can depend on a host of factors, including the amount of resources shared, the length of time that those resources were shared, the reliability of the resources, responsiveness of the resources, and a conversion rate. For example, the GADs earned by users A, B and E in FIG. 4a can be dependent, not only on the amount of storage each user volunteered to share, and the length of time during which such storage was offered, but can further be dependent on the reliability of the storage device and computing device through which the storage was shared, and the network connectivity of the computing device, including whether the computing device was online and whether its connection bandwidth was sufficient. Thus, as indicated, if the computing device 10 shared two gigabytes for a day, user A's account can be credited with 2 GADs. However, if during that day, user A had been upgrading the operating system of the computing device 10, such that for a period of a few hours the computing device 10 was unavailable to access any other computing device, then user A's account can be credited with less than 2 GADs.

Figure 4A:
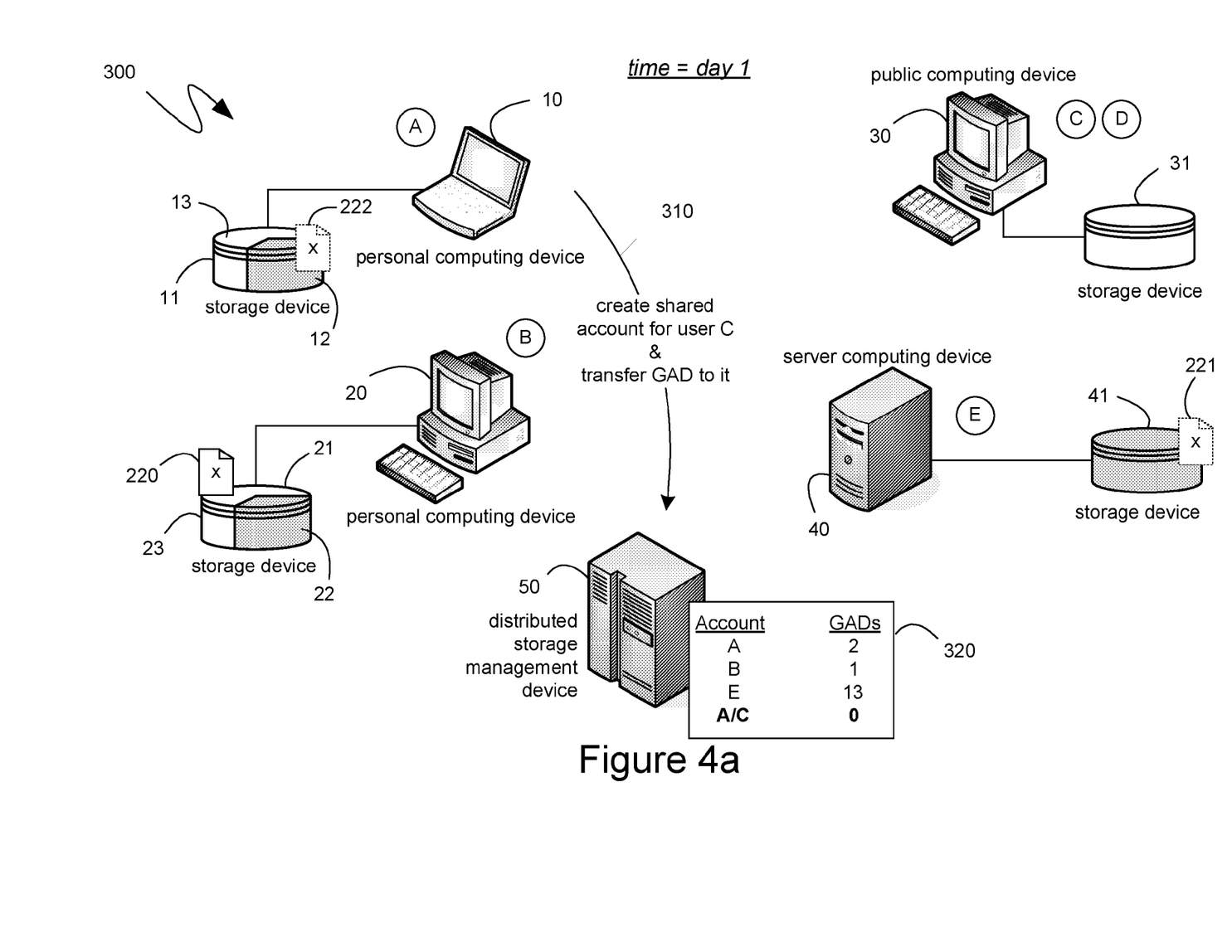
FIGS. 4a, 4b and 4c are block diagrams of an exemplary system supporting storage credit transfer.

In an alternative embodiment, resource credits can be granted, not merely for offering resources for sharing, but only when the offered resources are actually used. Thus, for example, the computing device 10 may have shared five gigabytes in the shared portion 12 of the storage device 11, but only two gigabytes can have been used by data such as the file portion 222 and, consequently, only 2 GADs can have been earned. Alternatively, rather than an all-or-nothing approach, the distributed storage management device 50 can grant some credits for resources that are being offered, but are not yet used, and can grant a greater amount of credit for shared resources that are actually being used.

Continuously monitoring a peer, such as the computing device 10 to verify the usage of the resources being shared, and their availability, can be impractical. For example, if the user A was upgrading the operating system of computing device 10, there may be transient moments when the computing device's connection to network 90 comprises very little useable bandwidth as the new operating system downloads large amounts of updates or drivers. Absent nearly constant monitoring, such transient moments are unlikely to be detected by the distributed storage management device 50 or other peers 20, 30 and 40. Consequently, in one embodiment, the risks inherent in sharing resources of personal computing devices can be accommodated by a risk factor multiplier that can appropriately adjust the resource credit earned by sharing resources. For example, computing device 10, being a portable computing device, in the example illustrated in FIG. 4a, may experience a higher amount of unavailability than the server computing device 40, which can be managed professionally and comprise redundant systems. Consequently, based on such information, which can be collected during an initial sign-up period or through subsequent polling, the distributed storage management device 50 can assign a risk factor multiplier to the computing device 10 that reduces the amount of GADs earned more than the risk factor multiplier assigned to the computing device 40.

Risks to a resource sharing system, such as system 300, are not limited to hardware or software issues. The behavior of the users of a resource sharing system can likewise place the system at risk. To enable tuning of a resource sharing system, the distributed storage management device 50 can grant credits, such as GADs, based not only on measurable factors, such as the amount of resources shared and the length of time for which they were shared, and on estimated risk factors, but also based on an adjustable conversion rate. Specifically, after accounting for measurable factors, and applying a risk factor, the amount of credit granted can be multiplied by a conversion factor that can either increase or decrease the amount of credit granted.

In one embodiment, the distributed storage management device 50 can monitor the outstanding number of credits, such as GADs, granted to the users' accounts in the database 320. The distributed storage management device 50 can likewise monitor the consumption of credits. If credits are being accumulated faster than they are being used, a credit surplus can occur. If all of these credits were used at one time, the resulting demand for storage capacity could exceed the shared storage capacity of the overall system. To prevent such an imbalance, the distributed storage management device 50 can lower the conversion factor as the credit surplus grows. For example, the conversion factor can be initially set to 1.0. If the distributed storage management device 50 determines that users are hording GADs, and that an imbalance is developing between the number of GADs outstanding, and the amount of storage space offered for sharing purposes, the distributed storage management device 50 can decrease the conversion factor to a value less than one, thereby requiring users to share more storage space to earn the same number of GADs. Conversely, if users are consuming their GADs such that the available shared storage within the system is very low, the distributed storage management device 50 can increase the conversion factor to a value greater than one, thereby encouraging users to share more storage space.

In an alternative embodiment, variations in the conversion factor can be applied, not only on a system-wide basis, but also on an individual basis. Returning to the example illustrated in FIG. 4a, user E is shown accumulating GADs via a dedicated computing device 40 that can be set up only to earn GADs. Such behavior can create an imbalance in the system 300, but decreasing the conversion rate can be unfair to a user such as users A or B that are not exhibiting any undesirable behavior. Consequently, the conversion rate can remain unchanged for users A and B, but can be decreased for user E. Such individually adjustable conversion rates can also be used to encourage desirable behavior by users of the resource sharing system. For example, individual users can be promised increased conversion rates if they sign up for other services, install other software, or otherwise perform actions deemed by the distributed storage management device 50 to be desirable.

Once a resource credit is earned, it can be used as a currency with which to purchase shared computing resources. In one embodiment, the user earning the credit can likewise use the credit. Thus, for example, in FIG. 4a, user B can be earning and using credits at an equal rate. Consequently, user B's account, as illustrated in database 320 can be unchanged from their account the prior day, as illustrated by database 210 in FIGS. 3a and 3b. However, while user B may not be gaining GADs, the file 220 can be stored both locally, on the locally accessible portion 23 of the storage device 21, and can further be remotely backed up across storage devices 11 and 41. Thus, user B, by sharing storage capacity that they likely would not have been using anyway, is receiving, essentially for free, the benefit of having important data backed up remotely and, thereby, protected against localized harm.

In an alternative embodiment, earned credits can be used, not by the user that earned them, but rather by other users to whom the earning user gifts or sells the credits. For example, as shown in FIG. 4a, users C and D can share a public computing device 30, such as might be found in an "Internet café" or public library. The storage device 31 locally connected to the public computing device 30 may not be sufficiently accessible to users C and D to enable them to earn GADs. Indeed, because the storage device 31 is local to a public computing device, users C and D may not be able to store any data on it, and may, therefore, be limited to storing their information on portable removable storage media that they bring with them when they use the public computing device 30.

In one alternative embodiment, user A can share an earned credit for the benefit of both user A and another user, such as user C. For example, user C can be a graphic designer located in a third-world country, limited to using public computing devices. In such a case, user A can request, via message 310 as shown in FIG. 4a, that the distributed storage management device 50 set up a shared account that can be accessed by both user A and user C. The resulting account is illustrated in bold type in database 320. Message 310 can further comprise a request from user A to transfer a GAD from user A's account, where it was placed by the distributed storage management device 50 as payment for the shared storage 12 shared by user A, into the shared account of users A and C.

Figure 4B:
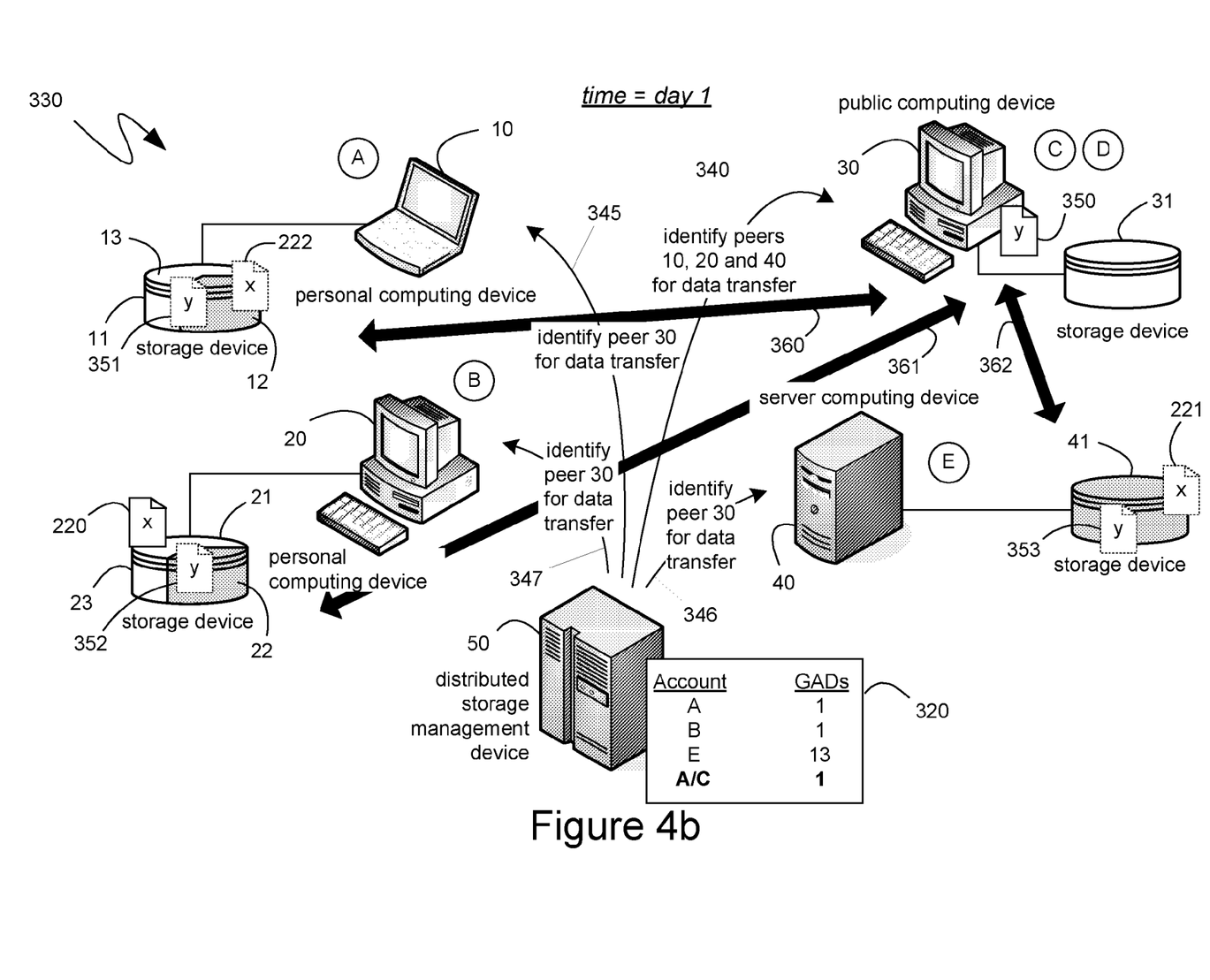

Turning to FIG. 4b, the existence of a GAD in the shared account of users A and C enables user C to store up to one gigabyte of data for one day without requiring user C to invest in their own personal storage media. Furthermore, because the account is shared between users A and C, user A can access the account as well, thereby enabling user C to, for example, provide user A with access to potentially very large graphics files without having to email them to user A. Users A and C can, thereby, collaborate on even very large projects without requiring that user C have access to consistent computer storage media.

As shown in FIG. 4b, user C can create a file 350, which can remain in active memory on the computing device 30 and need not be saved to the storage device 31. Initially, the distributed storage management device 50 can, as before, identify relevant peers to one another. Therefore, upon receiving a request to use the GAD associated with the shared account, the distributed storage management device 50 can identify, via message 340, computing devices 10, 20 and 40 to the public computing device 30, enabling a client on that computing device to attempt to initiate peer-to-peer communications with those devices. The distributed storage management device 50 can likewise, via messages 345, 346 and 347 identify the computing device 30 to each of the computing devices 10, 40 and 30, respectively, thereby enabling the computing devices 10, 30 and 40 to establish peer-to-peer communications with computing device 30.

Once peer-to-peer connections 360, 361 and 362 have been established between the computing device 30 and computing devices 10, 20 and 40, respectively, the computing device 30 can, in the manner described in detail above, encrypt the file 350 and divide it into components in a fault-tolerant manner. Such components 351, 352 and 353 can be stored on the shared portions 12 and 22 of storage devices 11 and 21, respectively, and can also be stored on the storage device 41 which, in the illustrated example, only comprises shared capacity. Once remotely stored, the original file 350 can be deleted from the public computing device 30. Should user C wish to access the file 350, they can simply request the client executing on the public computing device 30 to initiate peer-to-peer communications with the computing devices 10, 20 and 40 and reassemble the file 350. User A, similarly having access rights to the shared account, can likewise access the file 350 by requesting their personal computing device 10 to initiate peer-to-peer communications with the computing devices 20 and 40 and reassemble the file 350. As an added benefit, user A can remove user C from the shared account once the project is completed and user C's employment ends, thereby preventing user C from misappropriating either the digital work that user A had commissioned, or the shared storage capacity that user A had provided.

In an alternative embodiment, however, a user that cannot earn credits may wish to have more private access to shared resources. In such a case, a user that has earned credits can gift or sell those credits and, once deposited in an account to which the earning user has no access, the GADs can become the exclusive property of the account holder. For example, turning to FIG. 4c, user D can, like user C, not have any means by which to earn resource credits. However, user D can offer to purchase resource credits from user A. In such a case, user D desires exclusive access to the remote storage and would not purchase credits from user A if user A would continue to have access to the remote storage. Consequently, user A can request, via message 380, that the distributed storage management device 50 create an account for user D and transfer one of user A's earned GADs to the new account. Thus, as illustrated by the bold text in database 390, a new account assigned to user D only can be created and a GAD can be transferred from user A's account to this new account. Unlike the account created by user A for sharing files with user C, the account requested by message 380 is not associated with user A and once user D sets up their password, or other security mechanism, user A, along with every other user, will be excluded from the account, even though the GAD used to fund the remote storage was originally earned by user A. In such a manner users, such as user E, can set up dedicated computing devices, such as the server computing device 40, which can earn resource credits, which user E can then resell or otherwise barter or give away.

Figure 4C:
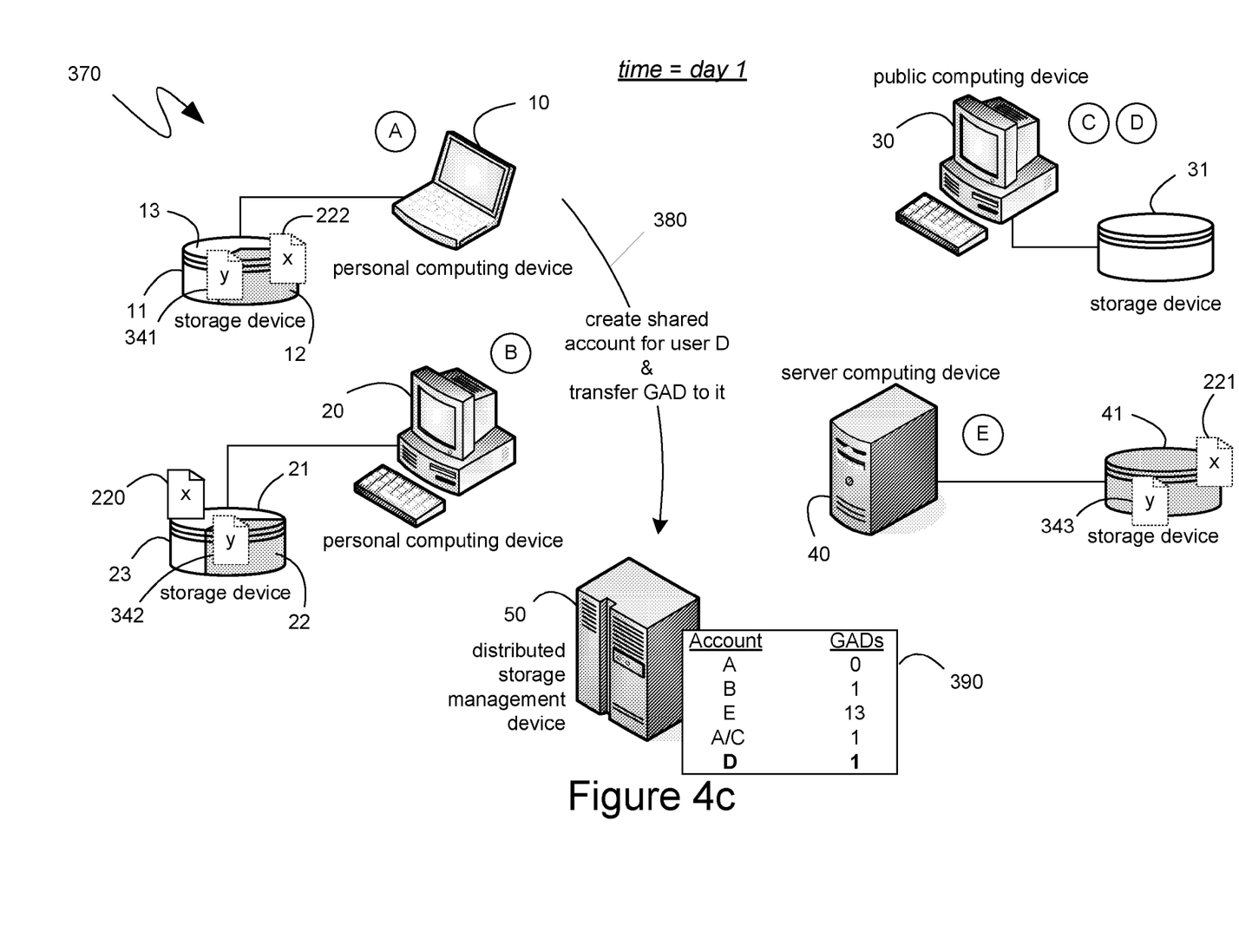

While the above descriptions have included the operation of the distributed storage management device 50 as an explicit computing device, in one embodiment the operations of the distributed storage management device 50 are performed by one or more server applications executing in a distributed fashion on one or more of the computing devices 10, 20, 30 and 40. For example, using consensus algorithms, such as the well known Paxos algorithms, computing devices 10, 20, 30 and 40 could independently maintain databases equivalent to the database 390, such that, so long as a majority of the computing devices 10, 20, 30 and 40 remained operational, the overall system 370 could continue to function and continue to update the database appropriately.

Figure 5:
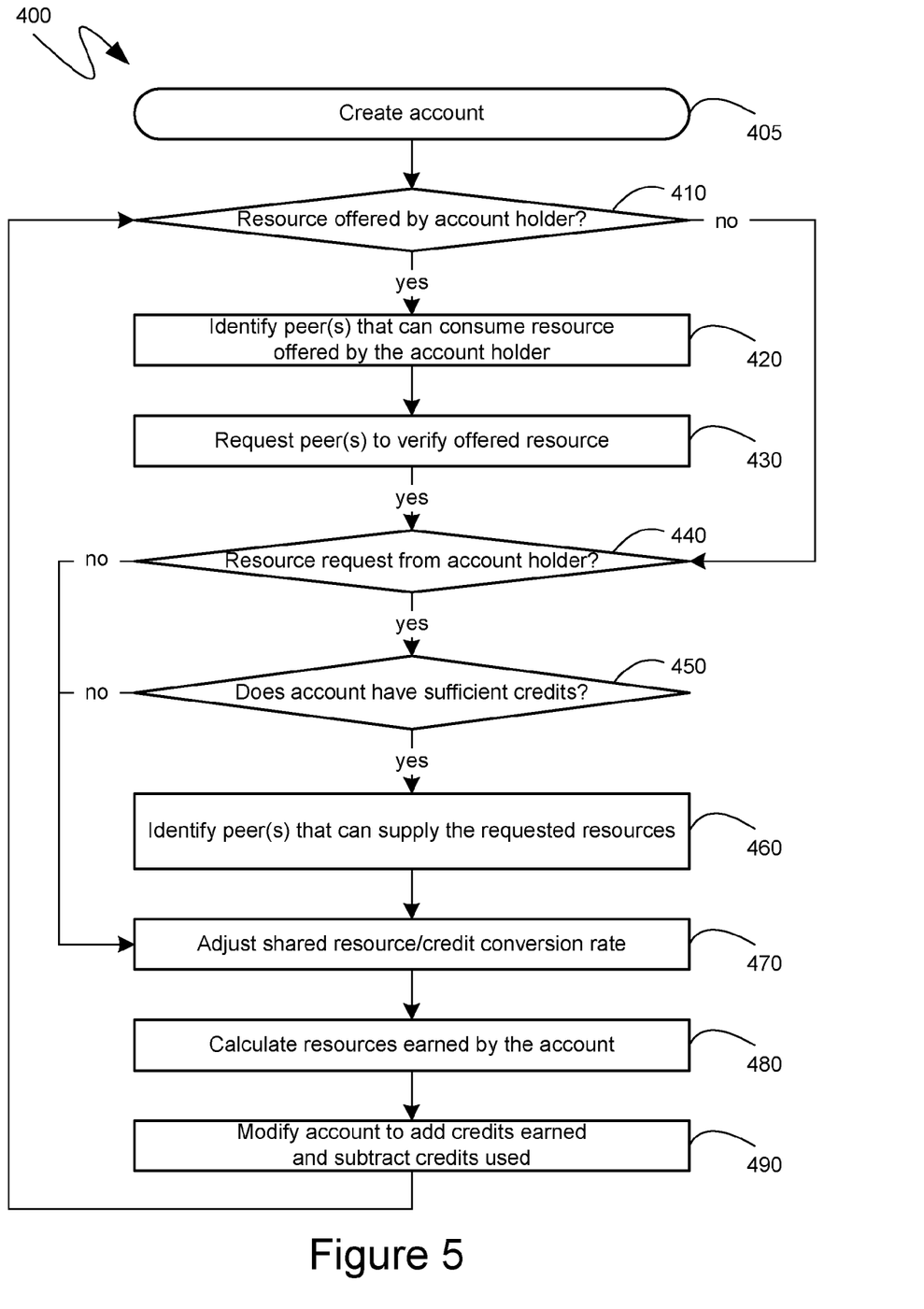
FIG. 5 is an exemplary system maintenance flow diagram.

Whether implemented as a centralized mechanism, or distributed among the constituent computing devices, management of the resource sharing system essentially comprises management of earned credits. Turning to FIG. 5, an exemplary flow chart 400 is shown illustrating management operations. Specifically, for any particular user, an initial step 405 can comprise the creation of an account, either by that user or for that user, either individually, or as a shared account with one or more other users. Subsequently, at step 410, a determination can be made regarding any resources, such as storage space, that have been shared by the account holder. If the account holder is not sharing any resources, processing can skip to step 440.

However, if the account holder is sharing resources, then, at step 420, consumers of such resources can be identified and the consuming peer or peers can be linked with the supplying peer associated with the current account to enable the exchange of resources through peer-to-peer communication. In one embodiment, step 420 may not occur until a sufficient amount of consumers have requested resources. Until such a time, the resources offered at step 410 can remain unused. As indicated previously, on a periodic basis the peers providing resources can be tested to ensure that the resources are being provided properly and non-maliciously. Consequently, at step 430, one of the peers consuming resources can be requested to verify the integrity of the resources, such as by requesting a hash of data stored in shared storage.

At step 440, a determination can be made if the account holder is requesting the use of one or more shared resources, such as attempting to store a file. If no such request is being made, then processing can skip to the credit accounting steps commencing with step 470. However, if the account holder is requesting a resource, a determination can be made at step 450 to ensure that the account has a sufficient number of credits to fulfill such a request. If a sufficient number of credits exist, the appropriate peers can be notified at step 460, thereby enabling peer-to-peer communication for exchanging the requested resource. If the account does not have a sufficient number of credits, processing can proceed to step 470, where a conversion factor can be adjusted, either on an individual account basis, or on an overall system basis, to maintain balance in the system and otherwise promote desirable behavior. The conversion factor can then be used at step 480 to determined the amount of resource credit earned by the account for any resources that the account was sharing. Finally, at step 490, the credits associated with the account can be adjusted to account for earned resource credits and used resource credits. After completing the resource credit accounting of step 490, the processing can return to step 410.

The management mechanisms of a resource sharing system such as that described above, can further comprise mechanisms for improving the performance of the overall system. For example, commonly accessed information can be cached, or otherwise stored in a greater number of locations, to enable faster access, especially if such information is being simultaneously accessed by multiple users. Alternatively, the data being stored in the shared storage can be identified, and identical data can be stored only once, though it can be referenced by multiple parties. For example, popular images or video clips may be stored by multiple users from multiple accounts. In one embodiment, such duplication can be identified and removed, instead pointing each account individually to a single instance of such data.

The management mechanisms of a resource sharing system can also attempt to dynamically adjust resource allocation to maintain an appropriate level of fault-tolerance. For example, if a peer is determined to have been lost or permanently disconnected, such that the data stored thereon is unrecoverable to the system, the system can compensate for such loss by redistributing the files whose components were lost, thereby providing an equivalent level of fault tolerance for each file on a dynamic basis.

While the above descriptions focus on a single form of resource credit, alternative embodiments contemplate different levels of resource credits, differentiating along, for example, reliability metrics. Thus, for example, one resource credit can entitle the account holder to access to a given resource for a given length of time with a 99.9% reliability rate. Another resource credit can entitle the account holder to access to the same amount of resources for the same amount of time, except with only a 90% reliability rate. The rate at which such resource credits are earned can then be adjusted accordingly, with credits for less reliable resources being earned more quickly than credits for more reliable resources.

As can be seen from the above descriptions, a self-sustaining resource sharing system is implemented through a pay-it-forward scheme, whereby credits are earned for the sharing of resources, and resource consumption requires the use of such credits. In view of the many possible variations of the subject matter described herein, we claim as our invention all such embodiments as may come within the scope of the following claims and equivalents thereto.

We claim:

1. One or more computer storage media comprising computer-executable instructions for sharing one or more computer-usable storage resources, the computer-executable instructions directed to steps comprising:
   determining an earned resource credit based on earning factors comprising: a quantity of offered storage resource, a duration of offering time during which the offered storage resource was available, a reliability rate of the offered storage resource, a risk factor, and a conversion factor;
   determining a consumed resource credit based on consuming factors comprising: a quantity of consumed storage resource and a duration of consuming time during which the consumed storage resource was used;
   incrementing an account by the earned resource credit;
   decrementing the account by the consumed resource credit;
   denying any request to consume a storage resource if a requesting account does not comprise a sufficient amount of earned resource credits; and
   informing a determination of the reliability rate and the risk factor by periodically instructing another computing device, other than a tested computing device, to initiate peer-to-peer communication with the tested computing device and to access, for testing and verification purposes, at least a portion of the offered storage resource, wherein the offered storage resource is associated with the tested computing device.

2. The computer storage media of claim 1 comprising further computer-executable instructions directed to incrementing the account by other earned resource credit transferred into the account from another account, the other account having received the other earned resource credit for offering a storage resource.

3. The computer storage media of claim 1, wherein the account is associated with multiple account holders, each having access to storage resources funded by resource credits from the account.

4. The computer storage media of claim 1, wherein the conversion factor is adjusted to maintain balance between an overall outstanding earned resource credit for all accounts and an overall quantity of currently offered storage resource.

5. The computer storage media of claim 1, wherein the earning factors further comprise a usage rate of the offered storage resource.

6. The computer storage media of claim 1, wherein the conversion factor is increased in response to desirable behavior by at least one account holder associated with the account.

7. A system for sharing one or more computer-useable storage resources comprising:
   a management computing device; multiple computing devices, at least some of the multiple computing devices comprising shared storage resources; and an account database associated with the management computing device, the account database comprising accounts for multiple users of the multiple computing devices, each account being associated with at least one user of at least one computing device, the accounts comprising resource credits enabling holders of the accounts to request access to one or more of the shared storage resources for a specified period of time; wherein the management computing device performs steps comprising:
   determining an earned resource credit based on earning factors comprising: a quantity of offered storage resource, a duration of offering time during which the offered storage resource was available, a reliability rate of the offered storage resource, a risk factor, and a conversion factor; determining a consumed resource credit based on consuming factors comprising: a quantity of consumed storage resource and a duration of consuming time during which the consumed storage resource was used; incrementing the resource credits of an appropriate account in the account database by the earned resource credit; decrementing the resource credits of the appropriate account in the account database by the consumed resource credit; denying any request to consume the shared storage resources if a requesting account, in the account database, does not comprise a sufficient amount of earned resource credits; and
   informing a determination of the reliability rate and the risk factor by periodically instructing at least one of the multiple computing devices, other than a tested computing device, to initiate peer-to-peer communication with the tested computing device and to access, for testing and verification purposes, at least a portion of the shared storage resource associated with the tested computing device.

8. The system of claim 7, wherein the shared storage resources comprise computer-readable storage space on one or more computer storage media.

9. The system of claim 7, wherein the account database further comprises at least one shared account associated with at least two users of the multiple computing devices, each of the at least two users having access to shared account storage resources paid for using resource credits associated with the shared account.

10. The system of claim 7, wherein the resource credits are transferable between accounts in the account database.

11. The system of claim 7 further comprising a resource credit awarding mechanism for adding resource credits to an account in the account database based on factors comprising: a quantity of offered storage resource shared by the account, a duration of offering time during which the offered storage resource was available, a reliability rate of the offered storage resource, a risk factor, and a conversion factor, wherein the reliability rate and the risk factor are informed by the instructing of the at least one of the multiple computing devices by the management computing device.

12. A method for sharing one or more computer-usable storage resources comprising the steps of:
   determining an earned resource credit based on earning factors comprising: a quantity of offered storage resource, a duration of offering time during which the offered storage resource was available, a reliability rate of the offered storage resource, a risk factor, and a conversion factor;
   determining a consumed resource credit based on consuming factors comprising: a quantity of consumed storage resource and a duration of consuming time during which the consumed storage resource was used;
   incrementing an account by the earned resource credit;
   decrementing the account by the consumed resource credit;
   denying any request to consume a storage resource if a requesting account does not comprise a sufficient amount of earned resource credits; and
   informing a determination of the reliability rate and the risk factor by periodically instructing another computing device, other than a tested computing device, to initiate peer-to-peer communication with the tested computing device and to access, for testing and verification purposes, at least a portion of the offered storage resource, wherein the offered storage resource is associated with the tested computing device.

13. The method of claim 12 further comprising the step of incrementing the account by other earned resource credit transferred into the account from another account, the other account having received the other earned resource credit for offering a storage resource.

14. The method of claim 12, wherein the conversion factor is adjusted to maintain balance between an overall outstanding earned resource credit for all accounts and an overall quantity of currently offered resource.

15. The computer storage media of claim 1, wherein the accessing the offered storage resource comprises either requesting a hash of data stored on the at least a portion of the offered storage resource or requesting the data stored on the at least a portion of the offered storage resource, the requesting the hash of the data and the requesting the data being performed with a periodicity inversely proportional to their computational and communicational cost.

16. The system of claim 7, wherein the accessing the shared storage resources of the tested computing device comprises either requesting a hash of data stored on the at least a portion of the shared storage resources or requesting the data stored on the at least a portion of the shared storage resources, the requesting the hash of the data and the requesting the data being performed with a periodicity inversely proportional to their computational and communicational cost.

17. The system of claim 11, wherein the conversion factor is adjusted to maintain balance between an overall outstanding resource credits across all accounts in the account database and an overall quantity of currently offered shared storage resources.

18. The method of claim 12, wherein the accessing the offered storage resource comprises either requesting a hash of data stored on the at least a portion of the offered storage resource or requesting the data stored on the at least a portion of the offered storage resource, the requesting the hash of the data and the requesting the data being performed with a periodicity inversely proportional to their computational and communicational cost.

* * * * *